Sept. 4, 1956

G. A. FAUGIER 2,761,650

LOAD-LOWERING MACHINE

Filed June 16, 1954

Gabriel Auguste Faugier
INVENTOR

BY Richardson David Nordon
his ATTORNEYS

United States Patent Office 2,761,650
Patented Sept. 4, 1956

2,761,650

LOAD-LOWERING MACHINE

Gabriel Auguste Faugier, Bron, France, assignor to Societe d'Etudes et de Construction d'Appareils de Securite J. R. G., Bron, France, a company of France Application June 16, 1954, Serial No. 437,170

Claims priority, application France July 6, 1953

7 Claims. (Cl. 254—153)

The present invention has for its object a load-lowering machine applicable to various purposes, such as the lowering of persons and different loads, more particularly the clearing of a building in the case of a calamity. This novel load-lowering machine includes the conventional winch returned automatically into its starting position by a coil spring and an automatic braking system operating during the unwinding of the winch, the cooperation between the said parts being remarkable by its reliability and the smoothness of its operation.

The braking of the winch is obtained, as a matter of fact, in accordance with the invention, by jaws the guiding of which is such that centrifugal force urges them against a stationary drum when a plate on which they are carried revolves in a direction corresponding to the unwinding of the winch, while the guiding of the jaws prevents during rewinding the action of centrifugal force and keeps the said jaws away from the winch drum.

Accompanying diagrammatic drawing illustrates, by way of example and in a non-limiting sense, a preferred embodiment of the said improved load-lowering machine. In the said drawing.

Figure 1:
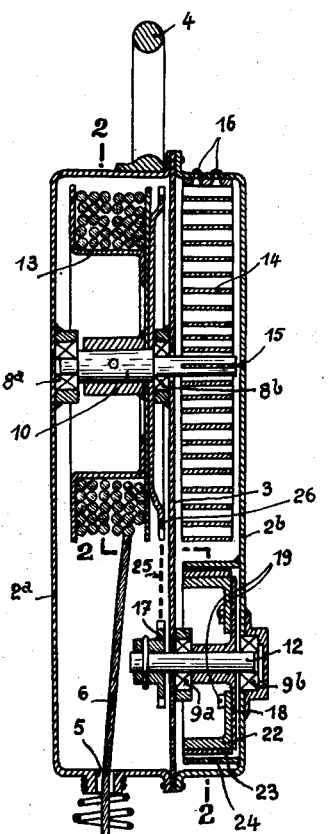
Fig. 1 is a vertical sectional view through line 1—1 of Fig. 2 during the rewinding stage of the winch cable.

As illustrated, the machine includes two sections 2a and 2b which are bolted together with the insertion of a medial partition 3 therebetween. The section 2a is provided with a ring 4 secured to its upper part so as to allow suspending the machine to a stationary point. The said section 2a is provided, furthermore, in a part thereof diametrically opposed to the ring 4, with a port 5 for the passage therethrough of a cable or rope 6 the free end of which terminates with an eye or loop 7. The section 2a and the medial partition 3 serve as supports for roller bearings 8a and 8b corresponding with each other on the section 2a and on the partition 3, and further roller bearings 9a and 9b corresponding with each other on the medial partition and on the section 2b. The first pair of roller bearings allows the free rotation of a spindle 10 inside the said bearings and the second that of a horizontal spindle 12.

To the spindle 10 is keyed a pulley 13 forming a winch drum and housed inside the section 2a, while the section 2b houses a spirally wound spring 14 one of the ends of which is secured at 15 to the spindle 10, while its other end is secured at 16 to the inner surface of the periphery of the section 2b.

To the spindle 12 are keyed, to either side of the medial partition, on one hand a pinion 17 and on the other hand a plate 18; the said plate 18 carries four pins or projections 19 which pass freely through the corresponding ports 21 provided two by two in two weights 22 the outer peripheries of which act as braking jaws provided with frictional linings 23. To the inner wall of the section 2b is secured coaxially with reference to the spindle 12 a stationary braking drum 24 inside which are housed the said jaws 22 for cooperation therewith.

The spindles 10 and 12 are interconnected by a chain 25 meshing on one hand with the pinion 17 rigid with the spindle 12 as mentiond hereinabove and on the other hand with the teeth 26 formed at the periphery of one of the flanges of the winch drum 13 round which the rope or cable is wound.

Figure 2:
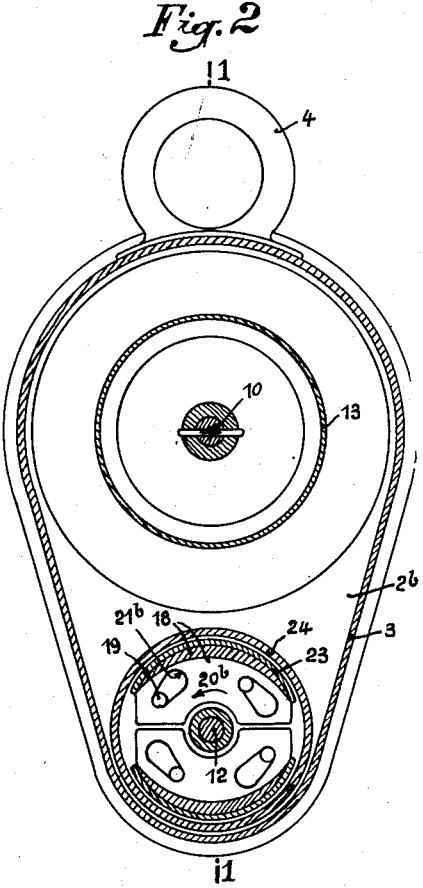
Fig. 2 is a sectional view through line 2—2 of Fig. 1.
Figure 3:
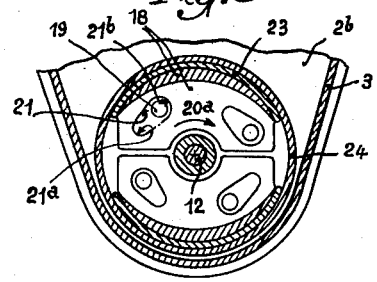
Fig. 3 is a partial section view through line 3—3 of Fig. 1, the machine being in the cable-unwinding stage.

It should be remarked that the ports 21 formed in the jaws 22 assume an elongated oblique shape with reference to the corresponding radii as clearly apparent from inspection of Figs. 2 and 3, the different ports flaring all in the same direction, i. e. clockwise, as seen in Fig. 3, the inner edge of the broader end of each slot extending further away from the operative surface of the jaw than the inner edge of the narrower end.

The load-lowering machine described may be used and operates in the following manner:

The machine being secured through its ring 4 to a hook or the like stationary member, a load constituted say by a person is suspended to the terminal eye or loop 7 of the cable 6. This results in a tractional action on the said cable, which unwinds off the winch pulley 13 and drives the latter into rotation and therewith the spindle 10. The spring 14 is thus stressed and winds round its spindle 10. The rotation of the spindle 10 produces also through the agency of the teeth 26 on its flange, of the chain 25 and of the pinion 17, a rotation of the spindle 12 and thereby of the plate 18 in the direction of the arrow 20a of Fig. 3. Centrifugal force produced by the rotation of the said plate 18 urges the jaws 22 apart and the elongated ports 21 in the said jaws have, in their flaring section 21b engaging the pins 19, a breadth such that the jaws may be shifted freely in the radial direction with reference to the said pins 19, and thus the said jaws are centrifugally urged against the stationary drum 24. This results in a braking action which is not sudden but gradual and depends on the actual weight hanging from the cable 6. In fact, the heavier this weight and the higher will the speed of unwinding of the cable and the speed of rotation of the plate 18 be, said speed of rotation increasing the centrifugal action to which the jaws 22 are submitted.

When the weight hanging from the cable or rope 6 reaches ground level, it is removed; the spirally wound spring 14 expands then and produces a rotation of the spindle 10 in a direction opposed to that of its preceding unwinding and this leads to a rewinding of the rope 6 over the pulley or drum 13.

During this rotation, the spindle 10 drives permanently through the teeth 26, the chain 25 and the pinion 17, the spindle 12 and the plate 18 on the latter; but the direction of rotation of the plate 18, as shown by the arrow 20b of Fig. 2 is then such that the guiding pins 19 engage the opposite narrower ends of the cooperating ports or slots and by reason of the slope assumed by the latter with reference to a radial direction, the jaws are urged, with reference to the pins or projections 19 sliding inside the said ports, towards the central spindle 12 until the projections 19 abut against the bottom of the said narrower ends 21a, at which moment the jaws have been shifted away radially from the stationary drum 24. This is the position illustrated in Figs. 1 and 2. The plate 18 is consequently free to rotate so that the rope or cable 6 may rise freely under the action of its spring 14.

The machine illustrated shows the following advantages: its execution is simple; its operation is reliable; the braking is progressive and depends on the weight of the suspended load; it may operate at a fast rhythm by reason of the high speed at which the rope or cable 6 is returned upwardly; it may be used starting from any height above ground, provided, of course, the said height is less than the length of the rope or cable 6; it may be used as a hoisting machine for returning the saddles in ski-lift arrangements.

Obviously, the invention is by no means limited to the sole embodiment disclosed hereinabove by way of exemplification and it covers, in contradistinction, all the modifications in its execution corresponding to its manifold applications and in particular, the number of braking jaws and sloping ports formed therein may be selected as desired, without unduly widening thereby the scope of the invention as defined in accompanying claims.

What I claim is:

1. A load-lowering machine comprising a winch, a spindle carrying same, an elongated yielding load-handling member wound over the said winch, a spiral spring urging the winch in the direction corresponding to the winding-in of the last mentioned member, a stationary brake drum, a rotary plate controlled by the rotation of the winch, a plurality of projections rigid with the said plate and extending in parallelism with the axis thereof, jaws each having an arcuate edge which engages the brake drum operatively, said jaws sliding freely over said rotary plate and each being provided with at least one transverse slot arranged obliquely with reference to a radius of the said plate and fitted over corresponding projections on the plate to be guided unrestrainedly thereby, the said slots being broader at one of their ends facing a given direction of rotation corresponding to the winding-in of the load-handling member and narrower at the opposite end, the broader end extending nearer the center of curvature of the arcuate outer edge of the jaws than the narrower end, the rotation of the winch in the winding-in direction urging the projections on the plates into the narrower ends of the slots and thereby urging the jaws away from operative engagement with the brake drum and the rotation in the opposite direction bringing the said projections into register with the broader ends of the slots to allow the jaws to be shifted centrifugally into engagement with the brake drum.

2. A load-lowering machine comprising a winch, a spindle carrying same, an elongated yielding load-handling member wound over the said winch, a spiral spring urging the winch in the direction corresponding to the winding-in of the last mentioned member, a stationary brake drum, a rotary plate controlled by the rotation of the winch, four projections rigid with the said plate and extending in parallelism with the axis thereof, two jaws which slide freely over said rotary plate and operatively engage the brake drum and are provided each with two slots arranged obliquely with reference to the corresponding radii of the said plate and fitted over corresponding projections on the plate to be guided unrestrainedly thereby, the said slots being broader at one of their ends facing a given direction of rotation corresponding to the winding-in of the load-handling member and narrower at the opposite end, the broader end extending nearer the center of curvature of the arcuate outer edge of the jaws than the narrower end, the rotation of the winch in the winding-in direction urging the projections on the plates into the narrower ends of the slots and thereby urging the jaws away from operative engagement with the brake drum and the rotation in the opposite direction bringing the said projections into register with the broader ends of the slots to allow the jaws to be shifted centrifugally into engagement with the brake drum.

3. A load-lowering machine comprising a winch, a spindle carrying same, an elongated yielding load-handling member wound over the said winch, a spiral spring urging the winch in the direction corresponding to the winding-in of the last mentioned member, a stationary brake drum, a rotary plate, a spindle coaxially rigid with the said plate, a pinion rigid with the said spindle, a sprocket wheel co-axially rigid with the winch and a chain operatively connecting the said pinion with the said sprocket wheel, a plurality of projections rigid with the said plate and extending in parallelism with the axis thereof, jaws which slide freely over said rotary plate and operatively engage the brake drum and are each provided with at least one transverse slot arranged obliquely with reference to a radius of the said plate and fitted over corresponding projections on the plate to be guided unrestrainedly thereby, the said slots being broader at one of their ends facing a given direction of rotation corresponding to the winding-in of the load-handling member and narrower at the opposite end, the broader end extending nearer the center of curvature of the arcuate edge of the jaws than the narrower end, the rotation of the winch in the rewinding direction urging the projections on the plates into the narrower ends of the slots and thereby urging the jaws away from operative engagement with the brake drum and the rotation in the opposite direction bringing the said projections into register with the broader ends of the slots to allow the jaws to be shifted centrifugally into engagement with the brake drum.

4. A load-lowering machine operating through a load-handling rope, comprising a casing including two flat terminal plates, a medial partition parallel with the said terminal plates and subdividing the casing into two adjacent compartments, two parallel spindles revolubly carried respectively between each terminal plate and the medial partition, a winch rigid with the first spindle including a peripherally toothed flange inside the first compartment for paying in and paying out the load-handling rope, a spring contained in the second compartment acting on the spindle carrying the winch in the direction corresponding to the paying-in of the rope, a pinion rigid with the second spindle and housed inside the first compartment, a chain operatively connecting the toothed flange of the winch with the said pinion, a stationary brake drum coaxial with the second spindle inside the second compartment, brake jaws slidingly carried inside the second compartment between the spindle in the latter and the brake drum and sliding freely in its plane between the said spindle and the said brake drum and urged centrifugally to shift its outer arcuate surface into engagement with the latter, the said jaws being each provided with at least one elongated slot, each slot extending between a broad end and a narrow end and having its broad end extending further away from the outer drum-engaging surface of the jaw than the narrower end, the different slots in the different jaws having all their narrower ends facing the direction of revolution of the spindle corresponding to the paying-in of the cable, a plate rigid with and perpendicular to the second spindle inside the second compartment, projections rigid with the said plate, parallel with the second spindle and engaging slidingly and unrestrainedly the cooperating slots in the jaws to enter, according to the direction of rotation, either of the ends of the said slots, to allow a radial drum-engaging centrifugal shifting of the jaws when the projections engage the broader ends of the slots.

5. A load-lowering machine comprising a winch, a spindle carrying same, an elongated yielding load-handling member wound over the said winch, a spiral spring urging the winch in the direction corresponding to the winding-in of the last-mentioned member, a stationary brake drum, jaws engaging the brake drum operatively, a rotary member revolving in unison with the winch and on which the jaws slide freely towards and away from the brake-drum, guiding means operatively connecting the jaws with said rotary member over which said jaws, when submitted to centrifugal force, are urged against said brake drum, and further guiding means over which said jaws are urged away from the first mentioned guiding means through a rotation of the winch and rotary member in the winding direction into positions holding said jaws away from engagement with the brake drum.

6. A load-lowering machine comprising a revoluble winch, an elongated yielding load-handling member wound over said winch, a spiral spring urging the winch in the direction corresponding to the winding-in of said yielding member, a stationary brake drum having an inner cylindrical surface, a plate rotating in unison with the winch, at least four projections rigid with and perpendicular to said movable plate, at least two jaws the outer outline of which matches the inner surface of the drum, a flange rigid with each jaw and sliding translationally over the rotating plate and provided with elongated ports engaging the corresponding projections on the plate, to guide said flange over the rotating plate in an unrestricted manner, the shape of the slots being such that, when the jaws are driven into one angular direction by the projections rotating in unison with the winding direction of the winch, the projections on the plate engage sections of the corresponding slots which hold said jaws away from the inner surface of the drum and, when the jaws are driven into the other angular direction by the projections rotating in unison with the unwinding direction of the winch, the projections on the plate engage sections of the corresponding slots inside which centrifugal force freely shifts the jaws outwardly through a sliding movement over the projections along said slot sections.

7. A load-lowering machine comprising a revoluble winch, an elongated yielding load-handling member wound over said winch, a spiral spring urging the winch in the direction corresponding to the winding-in of said yielding member, a stationary brake drum having an inner cylindrical surface, a plate rotating in unison with the winch, at least four projections rigid with and perpendicular to said movable plate, at least two jaws the outer outline of which matches the inner surface of the drum, a flange rigid with each jaw and sliding translationally over the rotating plate and provided with elongated ports engaging the corresponding projections on the plate, to guide said flange over the rotating plate in an unrestricted manner, said slots having an elongated shape, forming similar acute angles with reference to the corresponding jaw radii and flaring outwardly, the inner edge of the broader outer end of each slot extending further away from the outer operative surface of the jaw than the inner edge of the narrower inner end of said slot whereby, when the jaws are driven into one angular direction by the projections rotating in unison with the winding direction of the winch, the projections on the plate engage inner ends of the corresponding slots which hold said jaws away from the inner surface of the drum and, when the jaws are driven into the other angular direction by the projections rotating in unison with the unwinding direction of the winch the projections on the plate engage outer ends of the corresponding slots inside which centrifugal force freely shifts the jaws outwardly through a sliding movement over the projections along said outer ends.

References Cited in the file of this patent
UNITED STATES PATENTS

| 2,546,202 | Trouin | Mar. 27, 1951 |

FOREIGN PATENTS

| 669,438 | Great Britain | Apr. 2, 1952 |